(12) United States Patent
Yoshida et al.

(10) Patent No.: US 6,340,246 B1
(45) Date of Patent: Jan. 22, 2002

(54) OPTICAL CONNECTOR WITH SHUTTER

(75) Inventors: Futoshi Yoshida; Akihiro Shimotsu, both of Tokyo (JP)

(73) Assignee: Hirose Electric Co., Ltd., Tokyo (JP)

( * ) Notice: Subject to any disclaimer, the term of this patent is extended or adjusted under 35 U.S.C. 154(b) by 0 days.

(21) Appl. No.: 09/316,188

(22) Filed: May 21, 1999

(30) Foreign Application Priority Data

Jun. 5, 1998 (JP) ............................................ 10-157626

(51) Int. Cl.[7] .................................................. G02B 6/38
(52) U.S. Cl. ............................................ 385/73; 385/77
(58) Field of Search .............................. 385/55, 58, 60, 385/70, 77, 139; 439/138, 142

(56) References Cited

U.S. PATENT DOCUMENTS 5,348,487 A * 9/1994 Marazzi et al. ............. 439/138
5,845,036 A * 12/1998 De Marchi ................. 385/139

FOREIGN PATENT DOCUMENTS

| EP | 0570652 | 11/1993 |
|----|---------|---------|
| EP | 0613030 | 8/1994 |
| EP | 0823649 | 2/1998 |
| JP | 56107205 | 8/1981 |

* cited by examiner

*Primary Examiner*—Frank G. Font
*Assistant Examiner*—Michael P. Mooney
(74) *Attorney, Agent, or Firm*—Kanesaka & Takeuchi

(57) ABSTRACT

An optical connector comprises a housing (20) into which optical transmission devices (10A, B) are plugged, a movable member (40) movable with respect to the housing in accordance with movement of the optical transmission device (10B), and a shutter (52) attached to the movable member so as to be movable with respect to the housing in accordance with movement of the movable member for opening/closing the optical output of the optical transmission device.

4 Claims, 4 Drawing Sheets

OPTICAL CONNECTOR WITH SHUTTER

BACKGROUND OF THE INVENTION

1. Field of the Invention

The present invention relates to optical connectors for connecting optical transmission devices and, particularly, to an optical connector with a shutter.

2. Description of the Related Art

An optical connector is used to connect optical fibers for optical energy transmission. With the optical connector, the optical fibers are connected end-to-end for optical energy transmission. An optical connector with a shutter also has been developed.

The shutter is provided for two reasons. One is to prevent damage to the eye of the worker by the optical output from the optical transmission device. The other reason is to prevent collection of dust or dirt on the optical output area of the optical transmission device when only one optical transmission device is connected to the optical connector. Such an optical connector with a shutter is disclosed in Japanese patent application Kokai Nos. 9-211264 and 8-43681, and Japanese UM patent No. 3021638

The above two Kokai publications disclose an optical connector with a shutter, wherein a shutter is provided within the optical connector. The shutter is hinged to the inside wall of the optical connector for rotation. When the optical transmission device is plugged in the optical connector, the shutter is abutted against part of the optical transmission device for retreat and rotation toward the inside wall, thus allowing the optical transmission device to enter. Thus, it is not necessary to remove the shutter. The shutter is provided obliquely with respect to the optical axis of the optical transmission device so as to prevent the light of the optical transmission device from being reflected back to the device. However, the shutter makes the optical connector need an additional plugging length to accommodate the retreated shutter because the hinging section is not movable with respect to the optical connector. Consequently, the optical connector becomes large. In addition, the shutter covers only part of the laser output section of the optical transmission device so that the laser leaks or dust or dirt enters through a gap between the shutter and the output section.

The above UM patent discloses an optical connector with a shutter hinged to the outside wall of the optical connector. This shutter is rotated by hand toward the outside wall and covers almost completely the light output section of the optical transmission device so that neither laser leaks nor dust or dirt enters the optical transmission device. Since the shutter is provided on the outside of the optical connector, the optical connector becomes large.

SUMMARY OF THE INVENTION

Accordingly, it is an object of the invention to provide an optical connector with a compact shutter, which is able to prevent leak of laser or entry of dust or dirt.

It is another object of the invention to provide an optical connector with a compact shutter, wherein the shutter is retreated automatically when the associated optical transmission device is plugged in.

According to the invention there is provided an optical connector with a shutter, which comprises a housing into which an optical transmission device is to be plugged; a movable member movable with respect to the housing in accordance with movement of the optical transmission device; and a shutter attached to the movable member and movable with respect to the housing in accordance with movement of the movable member to close/open an optical output of the optical transmission device.

According to the preferred embodiment, the optical connector further comprises a spring member for biasing the shutter toward the optical output. It is also preferred that the shutter is made by press.

DESCRIPTION OF THE PREFERRED EMBODIMENTS

Figure 1:
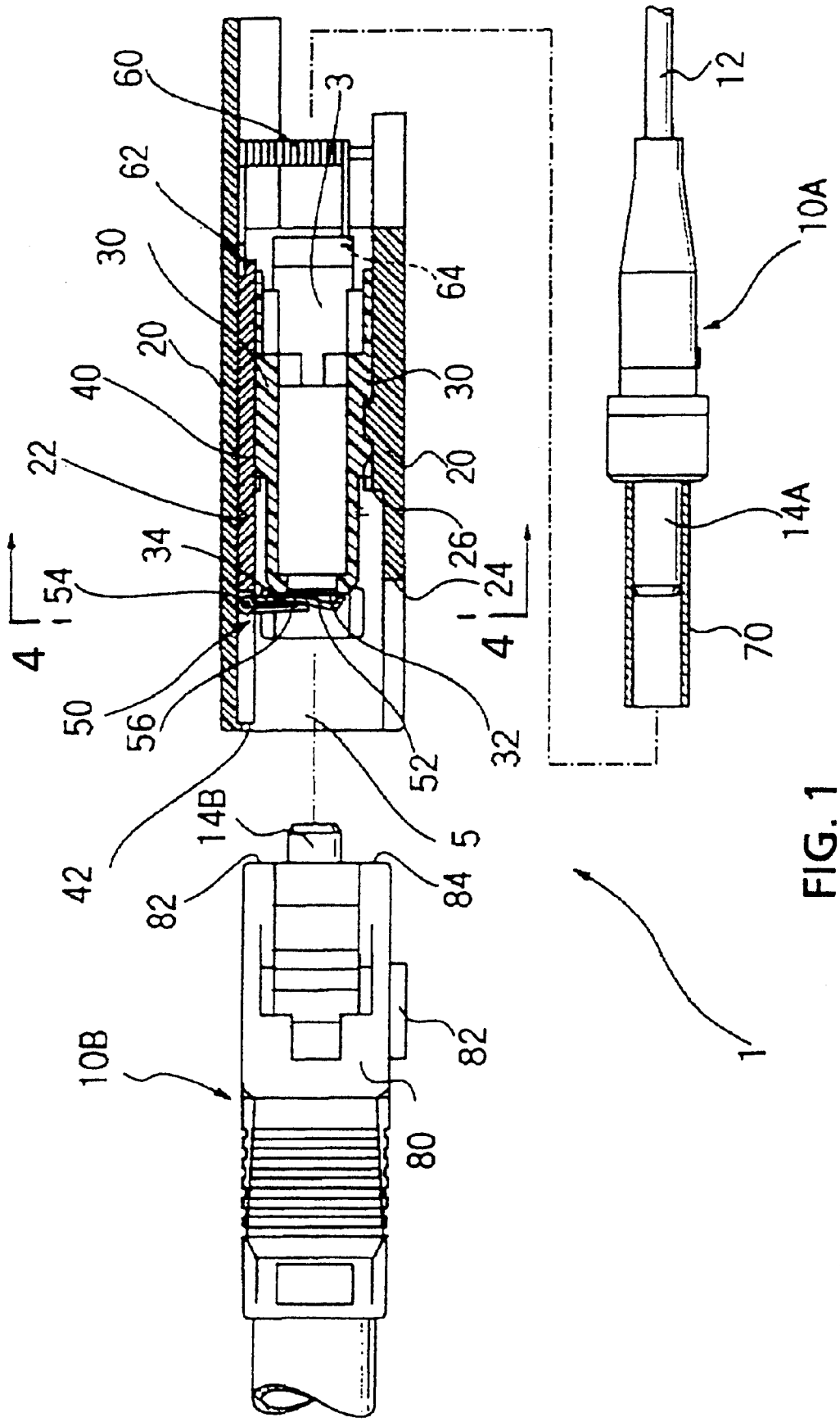
FIG. 1 is a sectional view of an optical connector according to an embodiment of the invention, together with optical fiber transmission devices and a peripheral in top view.

FIG. 1 shows an optical connector with a shutter, together with an optical fiber transmission device and its peripheral. The optical connector is shown in section while the optical fiber transmission device and its peripheral are in top plan view.

The optical connector 1 is equipped with a jack and comprises a connector housing 20, a sleeve 30 fixed within the connector housing 20, a movable member 40 provided between the connector housing 20 and the fixed sleeve 30, a cover member 50 for closing/opening an end face 32 of the sleeve 30, a movable spring 60 attached to the connector housing 20 and connected to the sleeve 30 and the movable member 40 at the ends, and a cylindrical sleeve 70 (attached to an end of the optical fiber transmission device 10A).

The connector housing 20 has a rectangular section. The movable member 40 has a thin flat shape corresponding to the connector housing 20 and provided between the connector housing 20 and the sleeve 30 so as to slide along the inner wall 22 of the connector housing 20. The ends 62 and 64 of the movable spring 60 are fixed to the movable member 40 and the sleeve 30, respectively, such that the movable spring 60 biases the movable member 40 toward the front of the connector housing 20.

The cover member 50 comprises a shutter 52 for closing/opening the end face 32 of the sleeve 30, a hinge pin 54 for attaching the shutter 52 at the front end of the movable member 40, and a pressure spring 56 for biasing the shutter 52 toward the end face 32 of the sleeve 30. The hinge pin 54 extends vertically or from top to bottom of the movable member 40 so that the shutter 52 can rotate by 90 degrees on the hinge pin 54.

The materials of the shutter include stainless steel and titanium alloys. These metals are resistant to light and inexpensive and suitable as shutter materials. The shutter may be made by coating a plastic with a metal.

A major oblique surface 57 (FIG. 3) is provided on the shutter 52 to prevent the light of the optical fiber transmission device 10A from being reflected by the shutter 52 back to the optical fiber transmission device when the sleeve end face 32 is closed by the shutter 52. The major oblique surface 57 is made by bending a flat plate at the abutment portion 34 against the sleeve 30 toward the outside of the sleeve 30 or the front of the connector housing 20. A minor oblique surface 58 is provided by bending the front portion of the flat plate toward the rear of the connector housing 20 or inside of the sleeve 30 because the major oblique surface 57 forms a vertical gap between the sleeve 30 and shutter 52. If the shutter is made from a metal, it is easy and inexpensive to make these oblique surfaces by bending.

The optical fiber transmission devices 10A and 10B are conventional. Each of the optical fiber transmission devices 10A and 10B comprises an optical fiber cord 12 including an optical fiber (not shown) and a ferrule 14A or 14B. In order to assemble an optical connector, the cylindrical sleeve 70 is attached to the ferrule 14A of the optical fiber transmission device 10A.

A peripheral or plug housing 80 is attached to the optical fiber transmission device 10B. The plug housing 80 is made rectangular corresponding to the connector housing 20. The outer circumference of the plug housing 80 is equal to or slightly smaller than the inside circumference of the connector housing 20. It works as not only a guide member for guiding the optical fiber transmission device 10B to the connector housing 20 but also a moving member for moving the movable member 40 as described hereinafter.

Figure 2:
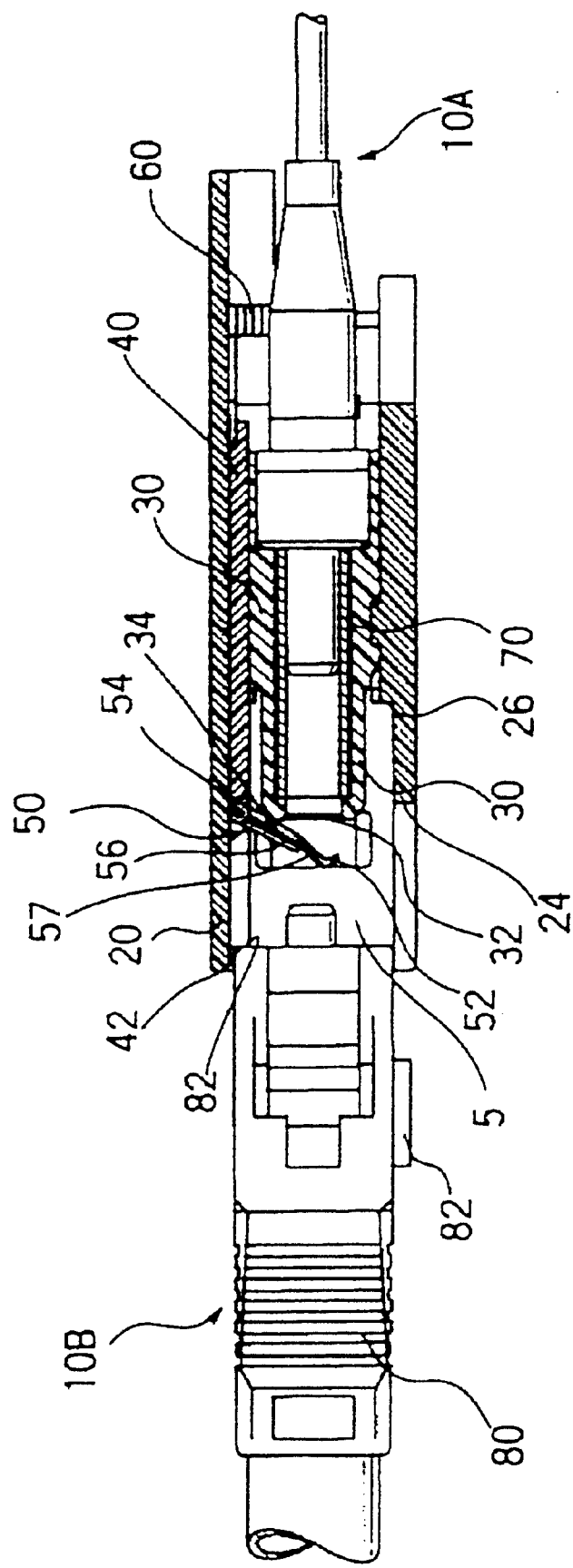
FIG. 2 is a sectional view of the optical connector into which the other optical fiber transmission device is being plugged.
Figure 3:
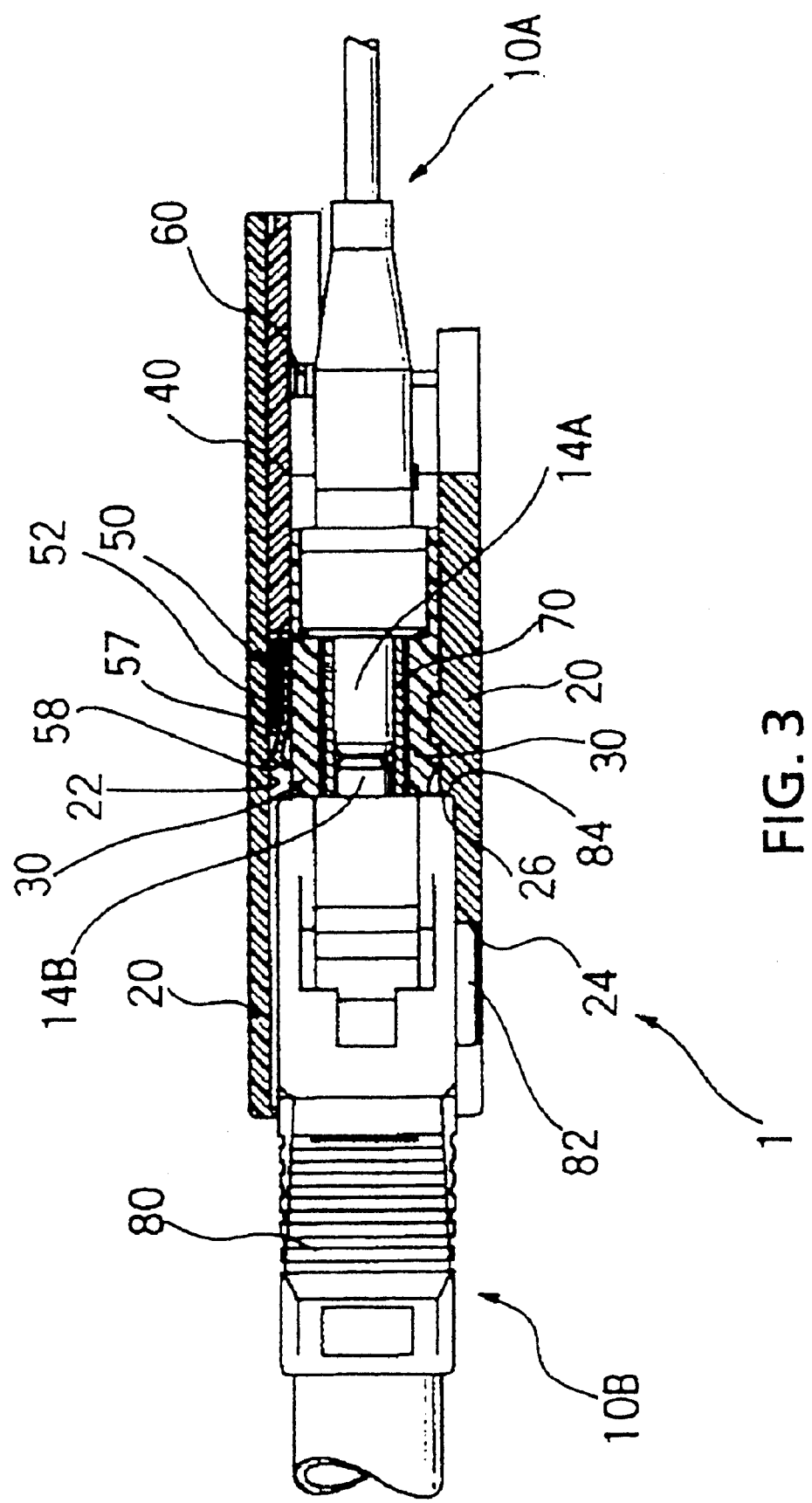
FIG. 3 is a sectional view of the optical connector in which both the optical fiber transmission devices are plugged.

How to use the optical connector for connecting the optical fiber transmission devices will be described with reference to FIGS. 1–3. FIG. 2 shows the optical fiber transmission device 10A completely inserted in the optical connector 1 and the optical fiber transmission device 10B in process of insertion into the connector housing 20. FIG. 3 shows both the optical fiber transmission devices 10A and 10B attached to the connector housing 20.

First of all, the optical fiber transmission device 10A with the cylindrical sleeve 70 is inserted into the optical connector 1 through the rear opening 3 such that the cylindrical sleeve 70 reaches the middle portion of the fixed sleeve 30 within the connector housing 20.

The portion of the cylindrical sleeve 70 which does not accommodate the ferrule 14A is used to accommodate the ferrule 14B of the optical fiber transmission device 10B. During the operation, the movable member 40 receives no force and remains at the same position as shown in FIG. 1.

Then, as shown in FIG. 2, the optical fiber transmission device 10B with the plug housing 80 is plugged into the optical connector 1 through the front opening 5 of the optical connector 1. Since the outside circumference of the plug housing 80 is equal to or slightly smaller than the inside circumference of the connector housing 20, the plug housing 80 and the optical fiber transmission device 10B are guided to a predetermined position of the connector housing 20. At this point, the front edge 42 of the movable member 40 is abutted against the front edge 82 of the plug housing 20 so that the movable member 40 is moved rearwardly or into the inside of the connector housing 20 against the movable spring 60.

As the movable member 40 is moved rearwardly, the hinge pint 54 is also moved rearwardly in the connector housing 20. As the hinge pin 54 moves rearwardly, the shutter 52 is retreated and rotated at the abutment portion 34 toward the inside wall of the movable member 40 against the pressure spring 56. Thus, the shutter 52 is gradually opened at the sleeve end face 32 to provide a plugging opening for the optical fiber transmission device 10B so that the connection between the optical fiber transmission devices is not blocked. In this way, the shutter 52 is opened (or closed) automatically in accordance with the insertion of the plug housing 80 so that it is not necessary to open the shutter by hand to connect the optical fiber transmission device to the optical connector.

FIG. 3 shows the optical fiber transmission device 10B with the plug housing 80 plugged in the connector housing 20. At this point, the front ends of the ferrules 14A and 14B of the optical fiber transmission devices 10A and 10B are connected to each other, and part of the sleeve 30 is plugged in a gap between the plug housing 80 and the optical fiber transmission device 10B. The shutter 52 is retreated completely in the gap between the connector housing 20 and the sleeve 30.

The fitting degree of the optical fiber transmission device 10B and the plug housing 80 to the connector housing 20 is restricted by the abutment between the projection 82 of the plug housing 80 and the front end 24 of the connector housing 20 or the abutment between the front edge 84 of the plug housing 80 and the inside flange 26 of the connector housing 20.

Figure 4:
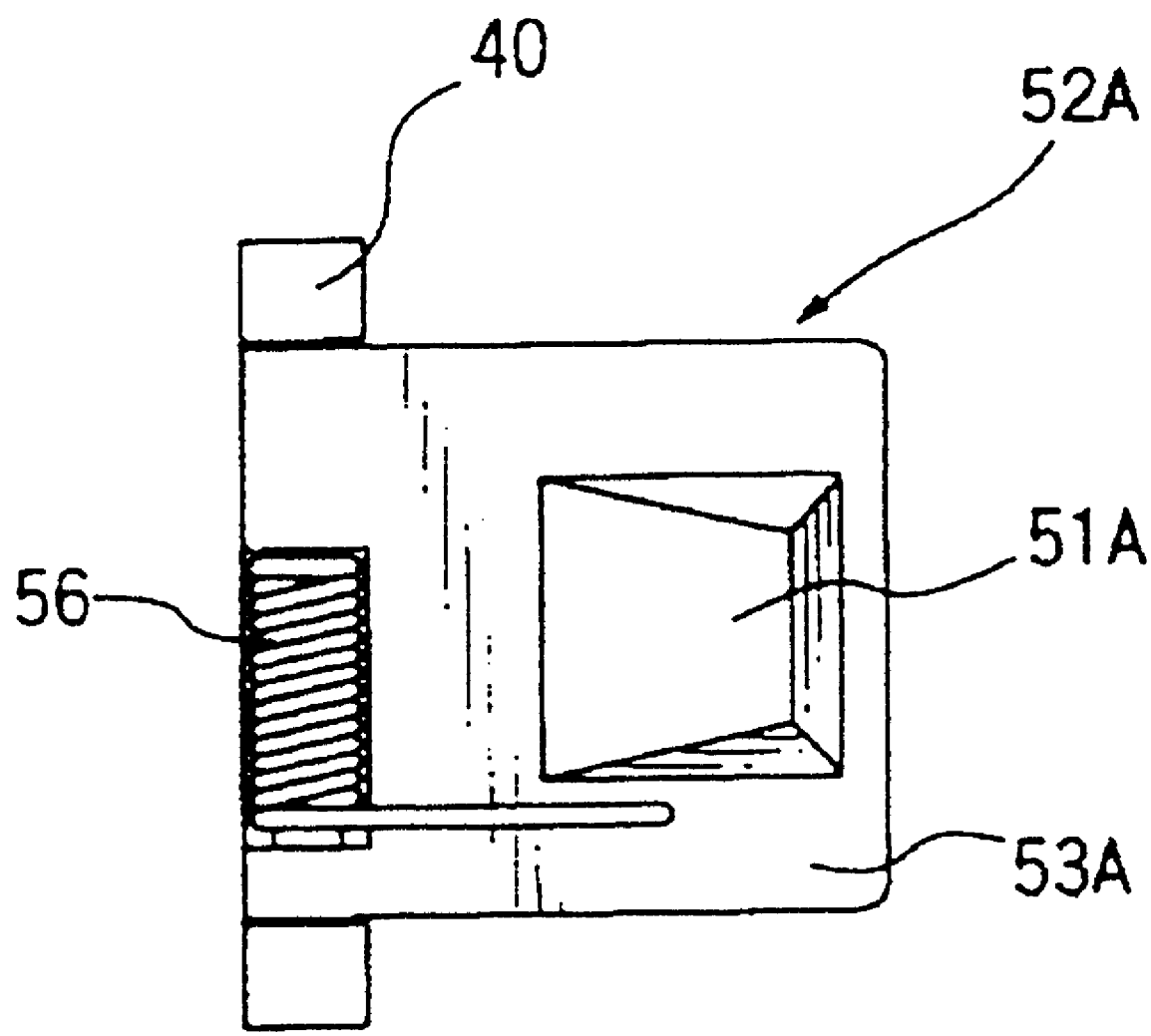
FIG. 4 is a sectional view taken along line 4—4 of FIG. 1, showing a shutter according to another embodiment of the invention.

FIG. 4 shows another embodiment of a shutter in section taken along line 4—4 of FIG. 1, with the connector housing 20 omitted. A protruded section 51A is pressed out at the center of a shutter 52A so as to provide an oblique surface comparable with the oblique surface 57 of FIG. 3. The major oblique surface prevents reflection of the light by the shutter 52 back to the optical fiber transmission device. The peripheral surface 53A around the protruded section 51A has a flat rear face which abuts against and covers the peripheral area of the sleeve. Consequently, the shutter 52A does not make any gap between the shutter and the sleeve, thereby closing the sleeve end face almost completely. A protruded section of the shutter comparable with the protruded section 51A may be made by forming a recess in a thick plate. The shutter 52A is more complicated than the shutter 52 of FIGS. 1–3 but has a great advantage to cover almost all the sleeve end face.

The opening operation of the shutter in connection between the optical fiber transmission devices has been described, and the closing operation of the shutter is achieved by the above procedures done in reversed order. The front ends of ferrules are connected in the above embodiments, but the optical connector is useful for connecting an optical fiber itself and a plug member. The optical connector is useful for other optical transmission devices.

According to the invention there is provided an optical connector with a compact shutter, which is able to prevent leak of laser and entry of dust and dirt almost completely.

What is claimed is:

1. An optical receptacle connector with a shutter, comprising:
   a housing into which a pair of optical transmission devices is plugged;
   a movable member movable with respect to said housing in accordance with movement of said optical transmission devices; and
   a shutter attached to said movable member and movable with respect to said housing in accordance with movement of said movable member to close/open an optical output of said optical transmission devices.

2. The optical connector according to claim 1, which further comprises a spring member for biasing said shutter toward said optical output.

3. The optical receptacle connector according to claim 1, wherein said shutter has an oblique surface at a center thereof.

4. An optical receptacle connector with a shutter, comprising:
   a housing into which a pair of optical transmission devices is plugged;
   a sleeve fixed within said housing;
   a movable member movable with respect to said housing in accordance with movement of said optical transmission devices; and
   a shutter attached to said movable member and movable with respect to said housing in accordance with movement of said movable member to close/open an optical output of said optical transmission devices, wherein said movable member has a thin flat shape and is provided between said housing and said sleeve so as to slide along an inner wall of said housing.

* * * * *